(12) United States Patent
Kawai et al.

(10) Patent No.: US 9,990,590 B2
(45) Date of Patent: Jun. 5, 2018

(54) MACHINE LEARNING APPARATUS AND METHOD FOR OPTIMIZING SMOOTHNESS OF FEED OF FEED AXIS OF MACHINE AND MOTOR CONTROL APPARATUS INCLUDING MACHINE LEARNING APPARATUS

(71) Applicant: FANUC CORPORATION, Yamanashi (JP)

(72) Inventors: Yasuo Kawai, Yamanashi (JP);
Kaname Matsumoto, Yamanashi (JP);
Tatsuya Senoo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 54 days.

(21) Appl. No.: 15/299,471

(22) Filed: Oct. 21, 2016

(65) Prior Publication Data

US 2017/0154283 A1 Jun. 1, 2017

(30) Foreign Application Priority Data

Nov. 30, 2015 (JP) ................................ 2015-234054

(51) Int. Cl.
*G06N 99/00* (2010.01)
*G06F 11/00* (2006.01)

(52) U.S. Cl.
CPC ......... *G06N 99/005* (2013.01); *G06F 11/006* (2013.01)

(58) Field of Classification Search
CPC .................................................. G06N 99/005

USPC ................................................ 318/638, 560
See application file for complete search history.

(56) References Cited

U.S. PATENT DOCUMENTS 7,205,743 B2 * 4/2007 Iwashita .............. G05B 19/404
318/432

FOREIGN PATENT DOCUMENTS

| JP | 7-284286 A | 10/1995 |
| JP | 10-268916 A | 10/1998 |
| JP | 2006-172141 A | 6/2006 |
| JP | 2007-164406 A | 6/2007 |
| JP | 2009-83074 A | 4/2009 |
| JP | 2014-514533 A | 6/2014 |

* cited by examiner

*Primary Examiner* — David S Luo
(74) *Attorney, Agent, or Firm* — Hauptman Ham, LLP

(57) ABSTRACT

A machine learning apparatus includes: a state observation unit that observes a state variable composed of at least one of data relating to the number of errors that is an error between a position command relative to a rotor of a motor which is drive-controlled by the motor control apparatus and an actual position of a feed mechanism unit, an operation program of the motor control apparatus, any command of the position command, a speed command, or a current command in the motor control apparatus, data relating to a workpiece machining condition in a machine tool including the motor control apparatus, and data relating to a state of the machine tool including the motor control apparatus; and a learning unit that learns a condition associated with the number of corrections used to correct the above-mentioned command in accordance with a training data set constituted by the state variable.

10 Claims, 9 Drawing Sheets

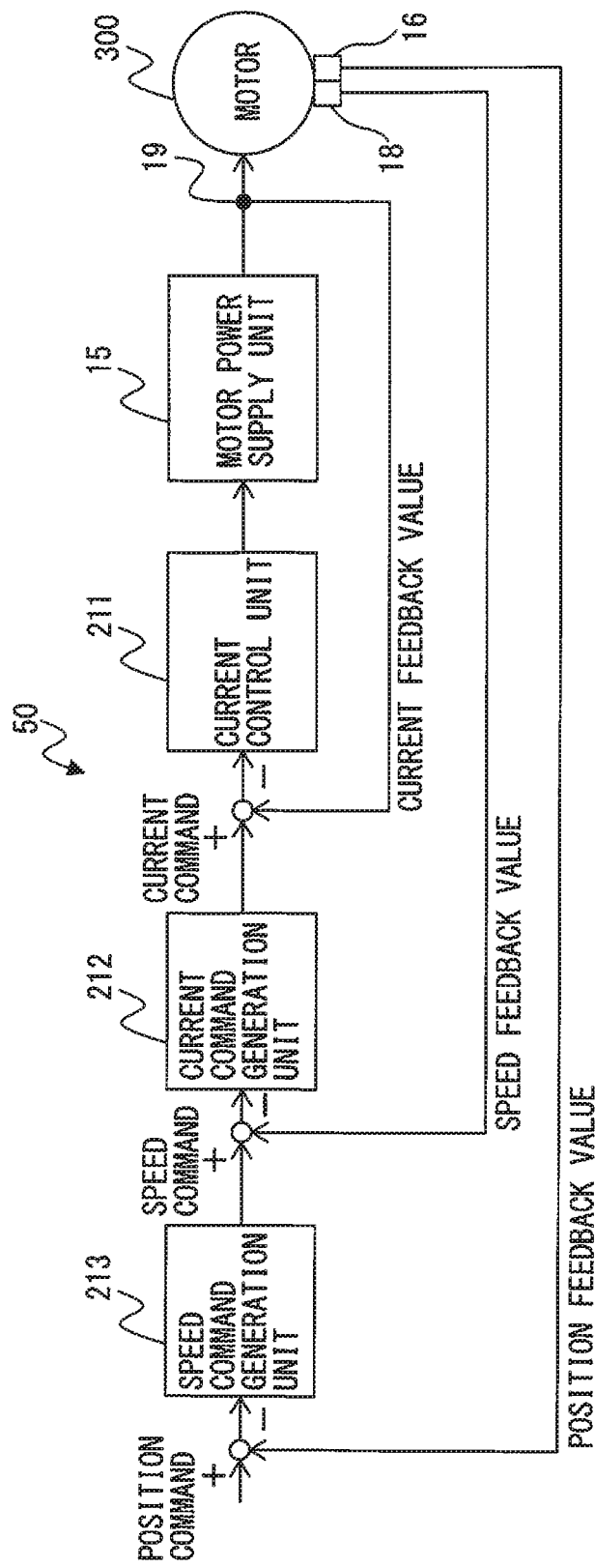

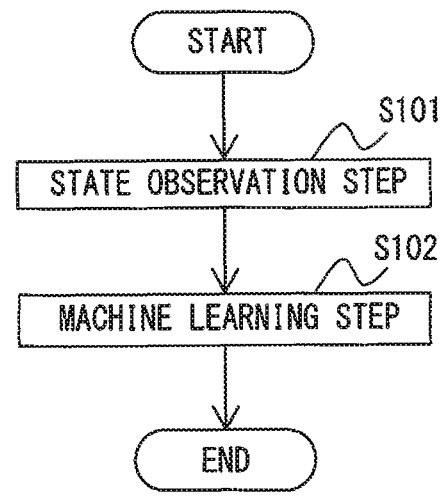
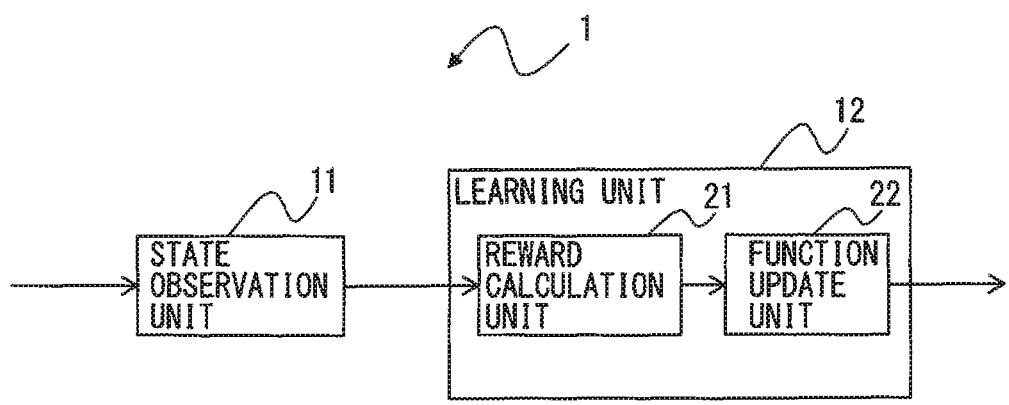

MACHINE LEARNING APPARATUS AND METHOD FOR OPTIMIZING SMOOTHNESS OF FEED OF FEED AXIS OF MACHINE AND MOTOR CONTROL APPARATUS INCLUDING MACHINE LEARNING APPARATUS

RELATED APPLICATIONS

The present application claims priority to Japanese Patent Application Number 2015-234054 filed Nov. 30, 2015, the disclosure of which is hereby incorporated by reference herein in its entirety.

BACKGROUND OF THE INVENTION

1. Field of the Invention

The present invention relates to a machine learning apparatus and method for learning a condition associated with the number of corrections for any command of a position command, a speed command, or a current command used to control a motor, and a motor control apparatus including the machine learning apparatus.

2. Description of the Related Art

The smoothness of feed of a feed axis of a machine, such as a machine tool, can be quantitatively grasped using the number of errors between a position command relative to a rotor of a motor and an actual position of a feed mechanism unit including the motor for operating the feed axis and various tools annexed thereto, and for example, the more the smoothness of feed of the feed axis of the machine deteriorates, the greater the number of errors becomes. The actual position of the feed mechanism unit includes an actual position of a machining unit that is obtained by an external sensor (linear scale) when a full-closed control is applied and an actual position of the rotor that is obtained by a pulse encoder provided to the motor when a semi-closed control is applied.

There are various deterioration factors in the smoothness of feed of the feed axis of the machine. For example, there are ones due to the motor, such as a togging torque generated with respect to the rotor and a difference of a rotor rotation direction of the motor and ones due to a motor control apparatus, such as an operation program used to control the motor and a magnitude of a torque command. In addition, a workpiece machining condition in the machine tool having the motor as a drive source, a magnitude of a cutting load during machining by the machine tool, a temperature of the machine tool, vibrations generated when each of drive axes operates in the machine tool having the plurality of drive axes, and the like, also constitute to deterioration of the smoothness of feed of the feed axis of the machine.

For example, since a torque ripple occurs once relative to each single rotation of an electrical angle of the motor, deterioration of the smoothness of feed due to the torque ripple is periodic.

Hitherto, periodic deterioration of the smoothness of feed due to the torque ripple is reduced by compensating the torque ripple in advance with the number of corrections in a reverse phase. FIG. 11 is a diagram illustrating compensation of the torque ripple with the number of corrections in the reverse phase. In FIG. 11, the torque ripple generated with respect to the rotor is indicated by a solid line, the number of torque ripple corrections is indicated by a dotted line, and a waveform after compensation of the torque ripple with the number of torque ripple corrections is indicated by a single dot chain line. Relative to the torque ripple generated with respect to the rotor, superposing in advance the number of torque ripple corrections in the reverse phase on the torque command allows the torque ripple to be eliminated, whereby deterioration of the smoothness of feed can be reduced.

In addition, for example, there is a case where as disclosed in Japanese Unexamined Patent Publication (Kokai) No. H7-284286, to reduce deterioration of the smoothness of feed caused by the torque ripple, in a speed loop provided with a speed loop corrector, compensation is made with an equivalent of a torque variation, thereby correcting the torque command.

Since as described above, deterioration of the smoothness of feed due to the torque ripple is periodic, generating such number of corrections as to be in the reverse phase relative to the torque ripple to reduce deterioration of the smoothness of feed is easy. However, deterioration of the smoothness of feed due to the workpiece machining condition in the machine tool having the motor as a drive source, the magnitude of a cutting load during machining by the machine tool, the temperature of the machine tool, the vibrations generated when each of the drive axes operates in the machine tool having the plurality of drive axes, and the like is reproducible to some extent but not periodic. FIG. 12 is a diagram illustrating the number of errors that is not periodic. The number of errors that is not periodic cannot be corrected using the number of corrections in the reverse phase, such as the number of errors due to the torque ripple.

SUMMARY OF INVENTION

In view of the problems as described, it is an object of the present invention to provide a machine learning apparatus and method capable of easily minimizing the number of errors between a rotor position command relative to a motor and an actual position of a feed mechanism unit, and a motor control apparatus including the machine learning apparatus.

To achieve the above-described object, a machine learning apparatus that learns a condition associated with the number of corrections for any command of a position command, a speed command, or a current command in a motor control apparatus includes: a state observation unit that observes a state variable composed of at least one of data relating to the number of errors between the position command relative to a rotor of a motor which is drive-controlled by the motor control apparatus and an actual position of a feed mechanism unit, an operation program of the motor control apparatus, any command of the position command, the speed command, or the current command in the motor control apparatus, data relating to a workpiece machining condition in a machine tool including the motor control apparatus, and data relating to a state of the machine tool including the motor control apparatus; and a learning unit that learns the condition associated with the number of corrections used to correct any command of the position command, the speed command, or the current command in the motor control apparatus in accordance with a training data set constituted by the state variable.

The state of the machine tool may include at least one of a temperature of the machine tool and vibrations of the machine tool.

Further, the learning unit may include: a reward calculation unit that calculates a reward based on the number of errors; and a function update unit that updates a function for calculating the number of corrections based on the state variable and the reward.

Further, the reward calculation unit may be configured to increase the reward when the number of errors is smaller than the number of errors observed by the state observation unit before the current number of errors, and reduce the reward when larger.

Further, the reward calculation unit may be configured to increase the reward when the number of errors is inside a specified range, and reduce the reward when the number of errors is outside the specified range.

Further, the function update unit may be configured to update the function for calculating the number of errors based on the state variable and the reward and in accordance with a neural network model.

Further, the learning unit may be configured to learn the condition in accordance with the training data set obtained with respect to the plurality of motor control apparatuses.

Further, the learning unit may include: an error calculation unit that calculates an error based on the number of errors; and a learning model update unit that updates a learning model for calculating the number of errors based on the state variable and the errors.

Further, the motor control apparatus that includes the machine learning apparatus as described above further includes: a decision-making unit that determines the number of corrections based on a result learned by the learning unit in accordance with the training data set and in response to an input of the current state variable; a correction unit that corrects any command of the position command, the speed command, or the current command in the motor control apparatus using the number of corrections determined by the decision-making unit; a motor power supply unit that supplies a drive power to the motor based on the command corrected by the correction unit; a position detection unit that detects the actual position of the feed mechanism unit; and an errors number measurement unit that measures the number of errors between the position command relative to the rotor and the actual position.

Further, a machine learning method for learning a condition associated with the number of corrections for any command of a position command, a speed command, or a current command in a motor control apparatus includes: a state observation step of observing a state variable composed of at least one of data relating to the number of errors between the position command relative to a rotor of a motor which is drive-controlled by the motor control apparatus and an actual position of a feed mechanism unit, an operation program of the motor control apparatus, any command of the position command, the speed command, or the current command in the motor control apparatus, data relating to a workpiece machining condition in a machine tool including the motor control apparatus, and data relating to a state of the machine tool including the motor control apparatus; and a learning step of learning the condition associated with the number of corrections used to correct any command of the position command, the speed command, or the current command in the motor control apparatus in accordance with a training data set constituted by the state variable.

BRIEF DESCRIPTION OF THE DRAWINGS

The present invention will be understood more clearly by referring to the following accompanying drawings:

FIG. 2 is a block diagram schematically illustrating a configuration of a drive command generation unit in a motor control apparatus;

FIG. 3 is a flow chart illustrating an operation flow of a machine learning method according to the embodiment;

FIG. 4 is a principle block diagram of the machine learning apparatus using; reinforcement learning according to the embodiment;

DETAILED DESCRIPTION

A machine learning apparatus and method that optimizes the smoothness of feed of a feed axis of a machine, and a motor control apparatus including the machine learning apparatus will be described below with reference to the drawings. It should be understood that the present invention is not limited to the drawings or embodiments described below.

Figure 1:
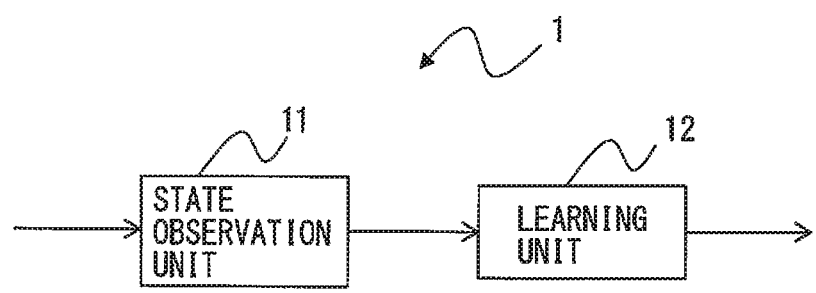
FIG. 1 is a principle block diagram of a machine learning apparatus according to an embodiment.

FIG. 1 is a principle block diagram of the machine learning apparatus according to an embodiment. Hereinafter, it is meant that components assigned identical reference numerals in different drawings are those having identical functions.

A machine learning apparatus 1 according to the embodiment is configured to learn the number of corrections for any command of a position command, a speed command, or a current command in a motor control apparatus.

The machine learning apparatus 1 includes a state observation unit 11 and a learning unit 12.

The state observation unit 11 observes a state variable composed of at least one of data relating to the number of errors between the position command relative to a rotor of a motor which is drive-controlled by the motor control apparatus and an actual position of a feed mechanism unit, an operation program of the motor control apparatus, any command of the position command, the speed command, or the current command in the motor control apparatus, data relating to a workpiece machining condition in a machine tool including the motor control apparatus, and, data relating to a state of the machine tool including the motor control apparatus. The feed mechanism unit includes the motor for operating the feed axis and various tools annexed thereto. The actual position of the feed mechanism unit includes an actual position of a machining unit that is obtained by an external sensor (linear scale) when a full-closed control is applied and an actual position of the rotor that is obtained by a pulse encoder provided to the motor when a semi-closed control is applied.

The data relating to the number of errors between the position command of the rotor and the feed mechanism unit, the data being observed as the state variable by the state observation unit 11, is used as internal data of the operation program stored in the motor control apparatus, and obtained from the motor control apparatus. The operation program of the motor control apparatus and any command of the position command, the speed command, or the current command in the motor control apparatus are also obtained from the motor control apparatus. Further, the data relating to a workpiece machining condition in the machine tool including the motor control apparatus and the data relating to the state of the machine tool including the motor control apparatus are obtained from the machine tool. The state of the machine tool includes at least one of a temperature of the machine tool and vibrations of the machine tool. Data relating to the temperature of the machine tool is obtained from a temperature sensor provided at an optional part in the machine tool. Data relating to the vibrations of the machine tool is obtained from a vibration sensor provided at an optional part in the machine tool.

The learning unit 12 learns a condition associated with the number of corrections used to correct any command of the position command, the speed command, or the current command in the motor control apparatus in accordance with a training data set constituted by the state variable. Further, the training data set may be acquired for a case where there is a plurality of motor control apparatuses; in such a case, the learning unit 12 learns the number of corrections to minimize the number of errors in accordance with the training data set created for the plurality of motor control apparatuses. Incidentally, the learning unit 12 may learn the number of corrections used to correct any command of the position command, the speed command, or the current command in the motor control apparatus based on a result learned by a learning unit in a machine learning apparatus separate from the machine learning apparatus 1 provided with the learning unit 12.

The position command, the speed command, and the current command in the motor control apparatus will be described with reference to FIG. 2. FIG. 2 is a block diagram schematically illustrating a configuration of a drive command generation unit in the motor control apparatus.

A drive command generation unit 50 that generates a drive command to control an inverter which supplies a drive power for driving an alternating current motor used as a drive source of the machine tool includes a position control loop, a speed control loop, and a current control loop. In the position control loop, based on information (position feedback value) relating to a rotor actual position of a three-phase alternating current motor 300 that is detected by a position detection unit 16 mounted to the three-phase alternating current motor 300 and the position command created by a position command creation unit (unillustrated), a speed command generation unit 213 creates the speed command. In the speed control loop, based on information (speed feedback value) relating to a rotor speed of the three-phase alternating current motor 300 that is detected by a speed detection unit 18 mounted to the three-phase alternating current motor 300 and the speed command created by the speed command generation unit 213, a current command generation unit 212 creates the current command. In the current control loop, based on information (current feedback value) relating to a current flowing from the inverter in a motor power supply unit 15 into the three-phase alternating current motor 300 that is detected by a current detection unit 19 and a current command value created by the current command creation unit 212, the drive command (for example, PWM control signal) for controlling a power conversion operation of the inverter in the motor power supply unit 15 is created using a current control unit 211. The inverter in the motor power supply unit 15 is, for example, an inverter for motor power supply that converts a direct current power into an alternating current power by a switching operation of a switching element internally provided, and, in accordance with the drive command received, controls the switching operation of the switching element in the inverter in the motor power supply unit 15, thereby controlling a conversion operation that converts the direct current power into the alternating current power for driving the three-phase alternating current motor 300. The three-phase alternating current motor 300 operates using the alternating current power outputted from the inverter in the motor power supply unit 15 as the drive power so that controlling the alternating current power outputted from the inverter in the motor power supply unit 15 allows a speed and a torque of the three-phase alternating current motor 300, or a position of the rotor to be drive-controlled. The three-phase alternating current motor 300 is driven, whereby a movable part of the machining tool is driven.

Thus, as commands in the motor control apparatus, there are the position command, the speed command, and the current command. The number of corrections learned by the learning unit 12 is used to correct any command of the position command, the speed command, or the current command in the motor control apparatus.

FIG. 3 is a flow chart illustrating an operation flow of the machine learning method according to the embodiment. The machine learning method for learning the condition associated with the number of corrections for any command of the position command, the speed command, or the current command in the motor control apparatus includes a state observation step S101 and a learning step S102.

The state observation step S101 is performed by the state observation unit 11, and, i.e., it observes a state variable composed of at least one of the data relating to the number of errors between the position command relative to the rotor of the motor which is drive-controlled by the motor control apparatus and an actual position of the rotor, the operation program of the motor control apparatus, any command of the position command, the speed command, or the current command in the motor control apparatus, the data relating to a workpiece machining condition in the machine tool including the motor control apparatus, and the data relating to a state of the machine tool including the motor control apparatus.

The learning step S102 is performed by the learning unit 12, and, i.e., it learns the condition associated with the number of corrections used to correct any command of the position command, the speed command, or the current command in the motor control apparatus in accordance with the training data set constituted by the state variable.

The learning unit 12 may use any learning algorithm. The machine learning apparatus 1 has functions of analytically extracting, from a set of data inputted to the apparatus, a useful rule, a knowledge representation, a criterion for judgment or the like contained therein, outputting a result of the judgment, and performing knowledge learning. The technique is various, and is broadly classified as "supervised learning", "unsupervised learning" or "reinforcement learning". Further, there is a technique referred to as "deep learning" that learns extraction of a feature value per se in order to realize these techniques. Note that the machine learning herein (machine learning apparatus 1) is realized by applying, for example, general-purpose computing on graphics processing units (GPGPU), large-scale PC clusters or the like.

Hereinafter, by way of example, a case in which reinforcement learning is used will be described with reference to FIGS. 4 and 5. "Supervised learning", "unsupervised learning" and the like will be described later.

FIG. 4 is a principle block diagram of the machine learning apparatus using reinforcement learning according to the embodiment. The learning unit 12 includes a reward calculation unit 21 and a function update unit 22. Note that components other than the reward calculation unit 21 and the function update unit 22 are similar to the components illustrated in FIG. 1; therefore, identical components are assigned identical reference numerals, and a detailed description thereof is omitted.

The reward calculation unit 21 calculates a reward based on the number of errors between the position command relative to the rotor of the motor which is drive-controlled by the motor control apparatus and an actual position of the rotor. The smaller the number of errors is, the higher reward the reward calculation unit 21 provides while recognizing that the amount of corrections used to correct any command of the position command, the speed command, or the current command in the motor control apparatus has a favorable influence. For example, the reward calculation unit 21 may be configured to increase the reward when the number of errors observed by the state observation unit 11 is smaller than the number of errors observed by the state observation unit 11 before the current number of errors, and reduce the reward when larger. Further, for example, the reward calculation unit 21 may be configured to increase the reward when the number of errors observed by the state observation unit 11 is inside a specified range, and to reduce the reward when the number of errors is outside the specified range. The specified range may be set as appropriate by the operator, taking into account of various factors, such as the manufacturing cost of the motor and the machine tool, the use environment, or the like.

The function update unit 22 updates a function (action value table) for calculating the number of corrections used to correct any command of the position command, the speed command, or the current command in the motor control apparatus, based on the state variable observed by the state observation unit 11 and the reward calculated by the reward calculation unit 21.

The learning unit 12 may calculate, in a multilayered structure, the state variable observed by the state observation unit 11 and update the function (action value table) in real time. For example, the function update unit 22 may be configured to update the function for calculating the number of corrections used to correct any command of the position command, the speed command, or the current command in the motor control apparatus, based on the state variable observed by the state observation unit 11 and the reward calculated by the reward calculation unit 21 and in accordance with a neural network model. As a method for calculating the state variable in a multilayered structure, it is possible, for example, to use a multilayered neural network, such as that illustrated in FIG. 9 described later.

Figure 5:
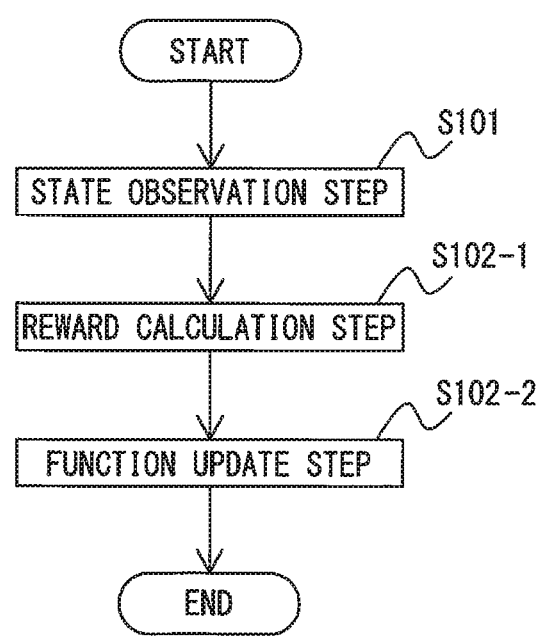
FIG. 5 is a flow chart illustrating an operation flow of the machine learning method using reinforcement learning according to the embodiment.

FIG. 5 is a flow chart illustrating an operation flow of the machine learning method using reinforcement learning according to the embodiment.

First, at state observation step S101, the state observation unit 11 observes a state variable composed of at least one of the data relating to the number of errors between the position command relative to the rotor of the motor which is drive-controlled by the motor control apparatus and an actual position of the feed mechanism unit, the operation program of the motor control apparatus, any command of the position command, the speed command, or the current command in the motor control apparatus, the data relating to a workpiece machining condition in the machine tool including the motor control apparatus, and the data relating to a state of the machine tool including the motor control apparatus.

Then, at reward calculation step S102-1, the reward calculation unit 21 calculates a reward based on the number of errors between the position command relative to the rotor of the motor which is drive-controlled by the motor control apparatus and an actual position of the feed mechanism unit.

Then, at function update step S102-2, the function update unit 22 updates the function (action value table) for calculating the number of corrections used to correct any command of the position command, the speed command, or the current command in the motor control apparatus, based on the state variable observed by the state observation unit 11 and the reward calculated by the reward calculation unit 21.

Subsequently, the motor control apparatus including the above-described machine learning apparatus will be described.

Figure 6:
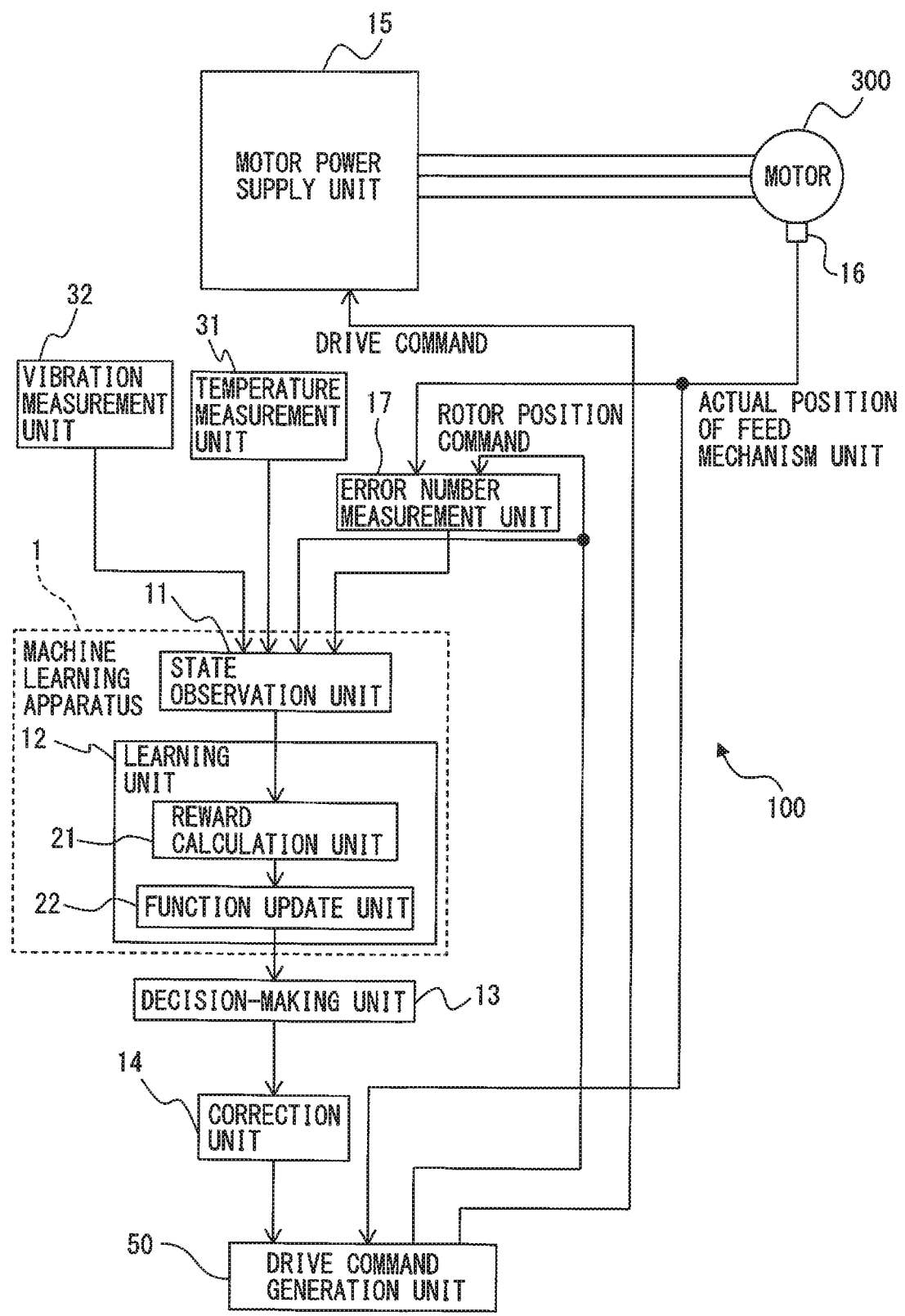
FIG. 6 is a principle block diagram illustrating a motor control apparatus including the machine learning apparatus using reinforcement learning according to the embodiment.

FIG. 6 is a principle block diagram illustrating the motor control apparatus including the machine learning apparatus using reinforcement learning according to the embodiment. A case in which the motor control apparatus 100 is provided in the machine tool and the three-phase alternating current motor 300 that serves as a drive source of the feed axis of the machine tool is controlled by the motor control apparatus 100 will be hereinafter described.

The motor control apparatus according to the embodiment includes the above-described machine learning apparatus 1, a decision-making unit 13, a correction unit 14, the motor power supply unit 15, the position detection unit 16, an errors number measurement unit 17, a temperature measurement unit 31, and a vibration measurement unit 32. Note that in FIG. 6, illustration of the speed detection unit and the current detection unit illustrated in FIG. 2 is omitted. Further, as described above, the actual position of the feed mechanism unit includes an actual position of the machining unit that is obtained by an external sensor (linear scale) when a full-closed control is applied and an actual position of the rotor that is obtained by a pulse encoder provided to the motor when a semi-closed control is applied, whereas in FIG. 6, as the actual position of the feed mechanism unit, an actual position of the rotor of the motor 300 that is detected by the position detection unit 16 (pulse coder) provided to the motor 300 is used.

The motor power supply unit 15 supplies a drive power to a motor 300 based on the drive command generated by the drive command generation unit 50. The motor power supply unit. 15 includes, for example, a rectifier that converts an alternating current power supplied from an alternating current power source side into a direct current power and outputs the same to a DC link and an inverter that is connected to the DC link, converts the direct current power in the DC link into an alternating current power, and supplies the same to the three-phase alternating current motor 300. Examples of the rectifier used are not particularly limited, and include, for example, a diode rectifier, a PWM control type rectifier or the like. Further, examples of the inverter are not particularly limited, and are generally a power converter capable of converting in an AC-DC bidirectional manner and include, for example, a PWM inverter. The PWM inverter is made of a bridge circuit including a switching element and diodes connected thereto in anti-parallel, and a switching operation of the switching element is PWM-controlled based on the drive command generated by the drive command generation unit 50. In other words, the inverter in the motor power supply unit 15 converts the direct current power supplied from a DC link side into a three-phase alternating current power having a desired voltage and a desired frequency for driving the three-phase alternating current motor 300 by switching operating the internal switching element based on the drive command received from the drive command generation unit 50. Thereby, the three-phase alternating current motor 300 operates based on the supplied three-phase alternating current power having a variable voltage and a variable frequency. Further, in reducing the speed of the three-phase alternating current motor 300, a regeneration power is generated, but in such a case, based on a motor drive command received from the drive command generation unit 50, an alternating current regeneration power generated in the three-phase alternating current motor 300 is converted into a direct current power which is returned to the DC link.

The position detection unit 16 is to detect an actual position of the rotor of the three-phase alternating current motor 300, and includes a pulse coder provided to the three-phase alternating current motor 300.

The errors number measurement unit 17 measures the number of errors between the position command relative to the rotor of the three-phase alternating current motor 300 which is obtained from the drive command generation unit 50 and the actual position detected by the position detection unit 16. Data relating to the number of errors measured by the error number measurement unit 17 is inputted into the state observation unit 11 in the machine learning apparatus 1.

The temperature measurement unit 31 is a temperature sensor installed at an optional part in the machine tool provided with the motor control apparatus 100, and measures a temperature of the machine tool. The temperature measurement unit 31 may be installed on a plurality of parts in the machine tool to measure a temperature at the plurality of parts. Data relating to the temperature of the machine tool measured by the temperature measurement unit 31 is inputted into the state observation unit 11 in the machine learning apparatus 1.

The vibration measurement unit 32 is a vibration sensor installed at an optional part in the machine tool including the motor control apparatus 100, and measures vibrations generated in the machine tool. The vibration measurement unit 32 may be installed on a plurality of parts in the machine tool to measure a temperature at the plurality of parts. Data relating to the vibrations of the machine tool measured by the vibration measurement unit 32 is inputted into the state observation unit 11 in the machine learning apparatus 1.

As described above, the machine learning apparatus 1 in the motor control apparatus 100 includes the state observation unit 11 and the learning unit 12.

The state observation unit 11 observes a state variable composed of the data relating to the number of errors measured by the error number measurement unit 17, the operation program of the motor control apparatus 100, any command of the position command, the speed command, or the current command in the motor control apparatus 100 that is obtained from the drive command generation unit 50, the data relating to a workpiece machining condition in the machine tool including the motor control apparatus 100, and the data relating to a state of the machine tool including the motor control apparatus 100. The state variable observed is used as a training data set for learning in the learning unit 12.

Note that herein, the data relating to a state of the machine tool including the motor control apparatus 100 is the data relating to the temperature of the machine tool measured by the temperature measurement unit 31 and the data relating to the vibrations of the machine tool measured by the vibration measurement unit 32, but data relating to a state of the machine tool other than the same may be used as a state variable. Further, the operation program of the motor control apparatus 100 may be obtained from a control unit (unillustrated) that entirely controls an operation of the motor control apparatus 100. In addition, the data relating to a workpiece machining condition in the machine tool including the motor control apparatus 100 may be obtained from a control unit (unillustrated) that entirely controls an operation of the motor control apparatus 100 or, alternatively, may be inputted by the operator through an input device (unillustrated).

The reward calculation unit 21 in the learning unit 12 calculates a reward based on the number of errors observed by the state observation unit 11. For example, the reward calculation unit 21 increases the reward when the number of errors observed by the state observation unit 11 is smaller than the number of errors observed by the state observation unit 11 before the current number of errors, and reduces the reward when larger. Further, for example, the reward calculation unit 21 increases the reward when the number of errors observed by the state observation unit 11 is inside a specified range, and reduces the reward when the number of errors is outside the specified range.

The function update unit 22 in the learning unit 12 updates the function (action value table) for calculating the number of corrections used to correct any command of the position command, the speed command, or the current command in the motor control apparatus 100 based on the state variable observed by the state observation unit 11 and the reward calculated by the reward calculation unit 21.

The decision-making unit 13 determines the number of corrections used to correct any command of the position command, the speed command, or the current command in the motor control apparatus 100 based on a result learned by the learning unit 12 in accordance with the training data set and in response to an input of the current state variable. In the present embodiment, since, by way of example, reinforcement learning is used as a learning algorithm, the function update unit 22 in the learning unit 12 updates, based on the reward calculated by the reward calculation unit 21 in the learning unit 12, the function for calculating the number of corrections used to correct any command of the position command, the speed command, or the current command in the motor control apparatus 100, and the decision-making unit 13 selects, based on the updated function, the number of corrections for which the highest reward is obtained.

The correction unit 14 corrects any command of the position command, the speed command, or the current command in the motor control apparatus 100 using the number of corrections determined by the decision-making unit 13. The command corrected using the number of corrections may be any of the position command, the speed command, or the current command.

The drive command generation unit 50 generates the drive command for controlling a power supply to the three-phase alternating current motor 300 by the motor power supply unit 15 based on the command corrected (any of the position command, the speed command, or the current command). A configuration of the drive command generation unit 50 in the motor control apparatus 100 is illustrated in FIG. 2. In other words, the drive command generation unit 50 includes the position control loop, the speed control loop, and the current control loop. In the position control loop, based on information (position feedback value) relating to a rotor actual position of the three-phase alternating current motor 300 that is detected by the position detection unit 16 mounted to the three-phase alternating current motor 300 and the position command created by the position command creation unit (unillustrated), the speed command generation unit 213 creates the speed command. In the speed control loop, based on information (speed feedback value) relating to a rotor speed of the three-phase alternating current motor 300 that is detected by the speed detection unit 18 mounted to the three-phase alternating current motor 300 and the speed command created by the speed command generation unit 213, the current command generation unit 212 creates the current command. In the current control loop, based on information (current feedback value) relating to a current flowing from the inverter in the motor power supply unit 15 into the three-phase alternating current motor 300 that is detected by the current detection unit 19 and the current command value created by the current command creation unit 212, the drive command (for example, PWM control signal) for driving the inverter in the motor power supply unit 15 is created using the current control unit 211. As described above, the inverter in the motor power supply unit 15 is, for example, a PWM inverter for motor power supply that converts a direct current power into an alternating current power by a switching operation of a switching element internally provided, and, in accordance with the drive command received, controls the switching operation of the switching element in the inverter in the motor power supply unit 15, thereby controlling a conversion operation that converts the direct current power into the alternating current power for driving the three-phase alternating current motor 300. The three-phase alternating current motor 300 operates using the alternating current power outputted from the inverter in the motor power supply unit 15 as the drive power so that controlling the alternating current power outputted from the inverter in the motor power supply unit 15 allows a speed and a torque of the three-phase alternating current motor 300, or a position of the rotor to be drive-controlled. The three-phase alternating current motor 300 is driven, whereby a drive axis of the machining tool is driven.

Figure 7:
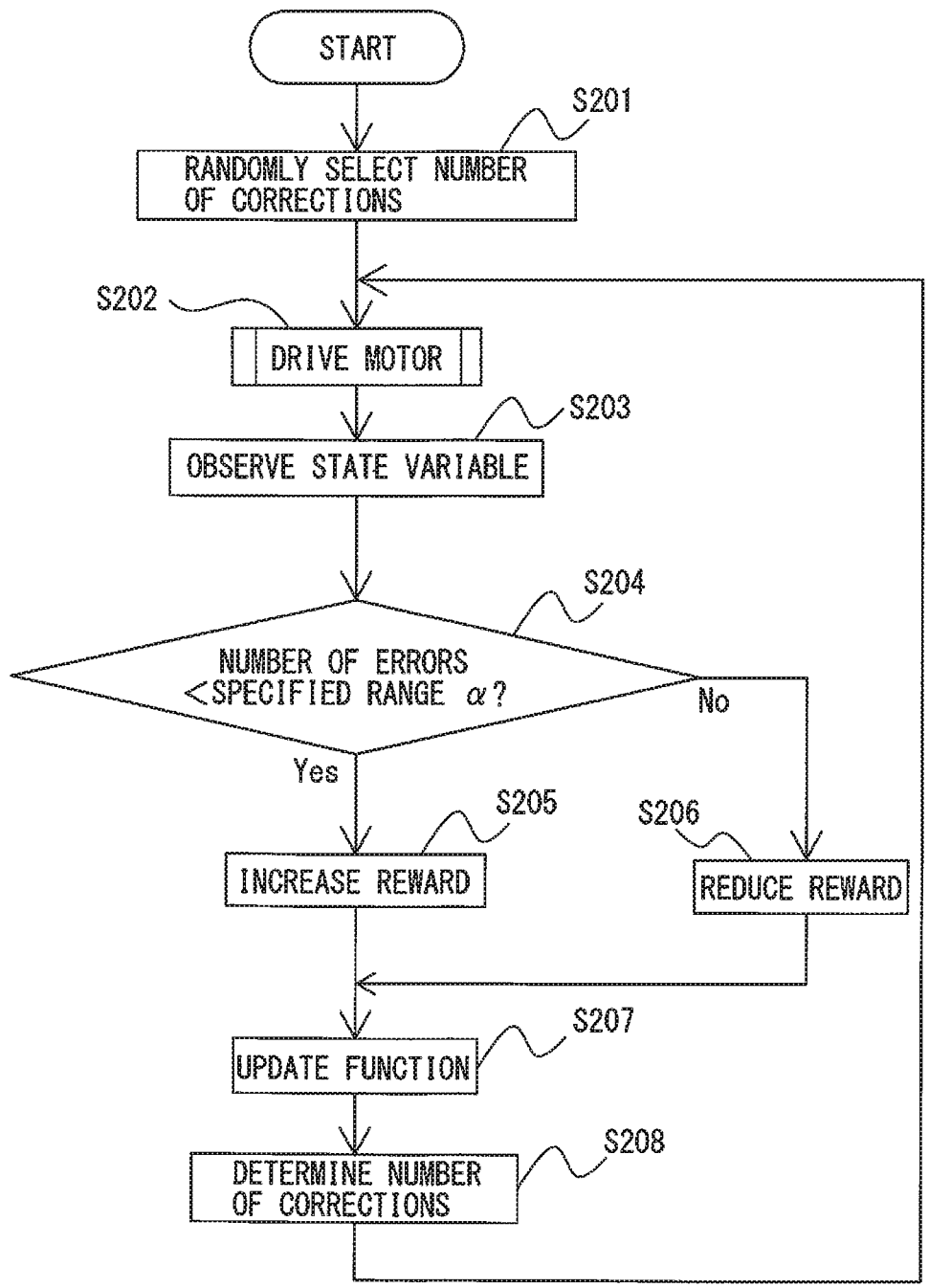
FIG. 7 is a flow chart illustrating an operation flow of the motor control apparatus including the machine learning apparatus using reinforcement learning according to the embodiment.

FIG. 7 is a flow chart illustrating an operation flow of the motor control apparatus including the machine learning apparatus using reinforcement learning according to the embodiment.

Generally, in reinforcement learning, the initial value of action is randomly selected. In the embodiment, at step S201, the number of corrections for the command (any of the position command, the speed command, or the current command) which is action is randomly selected.

At step S202, based on the command (any of the position command, the speed command, or the current command) corrected using the number of corrections as set, the drive command generation unit 50 generates a drive command for controlling a speed and a torque of the three-phase alternating current motor 300, or a position of the rotor, using an operation program of the three-phase alternating current motor 300, an alternating current or an alternating current voltage of the motor power supply unit 15 on a side of the three-phase alternating current motor 300 and/or a rotation speed of the three-phase alternating current motor 300 or the like. Thereby, the motor power supply unit 15 performs a power running operation (conversion operation) for converting an alternating current power into a direct current power and a regeneration operation (inverse conversion operation) for converting the direct current power into the alternating current power, and the three-phase alternating current motor 300 is driven by an alternating current drive power supplied. In the meantime, the position detection unit 16 detects an actual position of the rotor of the three-phase alternating current motor 300, the error number measurement unit 17 measures the number of errors between the position command relative to the rotor of the three-phase alternating current motor 300 which is obtained from the drive command generation unit 50 and the actual position detected by the position detection unit 16, the speed detection unit 18 detects a rotor speed of the three-phase alternating current motor 300, and the current detection unit 19 detects a current flowing from the inverter in the motor power supply unit 15 into the three-phase alternating current motor 300. Further, the temperature measurement unit 31 measures a temperature of the machine tool including the motor control apparatus 100, and the vibration measurement unit. 32 measures vibrations generated in the machine tool including the motor control apparatus 100.

At step S203, the state observation unit 11 observes a state variable composed of the data relating to the number of errors measured by the error number measurement unit 17, the operation program of the motor control apparatus 100, any command of the position command, the speed command, or the current command in the motor control apparatus 100 that is obtained from the drive command generation unit 50, the data relating to a workpiece machining condition in the machine tool including the motor control apparatus 100, and the data relating to a state of the machine tool including the motor control apparatus 100.

At step S204, the state observation unit 11 determines based on the data relating to the number of errors whether the number of errors is inside a specified range α. When it is determined by the state observation unit 11 that the number of errors is inside the specified range α, the reward calculation unit 21 increases the reward at step S205. In contrast, when it is determined by the state observation unit 11 that the number of errors is outside the specified range α, the reward calculation unit 21 reduces the reward at step S206. Although, in the example illustrated in FIG. 7, it is configured such that the reward calculation unit 21 increases the number of errors is inside the specified range α and reduces the reward when the number of errors is outside the specified range α, it may alternatively be configured such that the reward calculation unit 21 increases the reward when the number of errors observed by the state observation unit 11 is smaller than the number of errors observed by the state observation unit 11 before the current number of errors, and reduces the reward when larger.

At step S207, the function update unit 22 updates the function for calculating the amount of corrections used to correct any command of the position command, the speed command, or the current command in the motor control apparatus 100, based on the state variable observed by the state observation unit 11 and the reward calculated by the reward calculation unit 21.

At subsequent step S208, the decision-making unit 13 selects, based on the function updated at step S207, the number of corrections for which the highest reward is obtained. Then, the process returns to step S202 and thereafter, the processes of steps S202 to S208 are repetitively performed. Thereby, the machine learning apparatus 1 proceeds to learn the number of corrections for which the number of errors can be minimized. Incidentally, the training data set may be obtained from the plurality of motor control apparatuses 100, and in such a case, the learning unit 12 performs the processes of steps S201 to S208 repetitively in accordance with the training data set obtained with respect to the plurality of motor control apparatuses 100, and proceeds to learn the number of corrections. Upon the training data set being obtained with respect to the plurality of motor control apparatuses 100, the learning accuracy of the machine learning apparatus 1 is improved.

Next, the machine learning apparatus 1 will be described further in detail. The machine learning apparatus 1 has functions of analytically extracting, from a set of data inputted to the apparatus, a useful rule, a knowledge representation, a criterion for judgment or the like contained therein, outputting a result of the judgment, and performing knowledge learning. As described above, the learning algorithm of the machine learning apparatus 1 is broadly classified as "supervised learning", "unsupervised learning" or "reinforcement learning". Further, there is a technique referred to as "deep learning" that learns extraction of a feature value per se in order to realize these techniques. Note that the machine learning herein (machine learning apparatus 1) is realized by applying, for example, general-purpose computing on graphics processing units (GPGPU), large-scale PC clusters or the like.

"Supervised learning" is a model which provides a large number of data sets of some input and results (labels) to the learning apparatus 1 to learn features in the data sets and infer the results from the input, wherein a relationship can be recursively acquired. When applied to the present embodiment, supervised learning can be used in a part for calculating the number of corrections used to correct any command of the position command, the speed command, or the current command in the motor control apparatus. It can be realized using an algorithm such as neural network described later.

"Unsupervised learning" is a technique which provides a large number of input data alone to the learning apparatus 1 to learn how the input data is distributed and to learn a device that performs compression, sorting, shaping or the like with respect to the input data without providing corresponding teacher output data. For example, similar features in the data sets can be clustered. It is possible to achieve prediction of output using this result and by performing allocation of output such that some criteria is provided to optimize the same.

Further, as problem setting intermediate between "unsupervised learning" and "supervised learning", there is one referred to as "semi-supervised learning", which corresponds to a case in which only in some there is a set of data of input and output and in the remainder there is data of input alone. In the present embodiment, it is possible to use, in unsupervised learning, data that can be acquired without actually operating the motor control apparatus (for example, data of simulation) and perform learning efficiently.

First, an example in which the learning algorithm of the machine learning apparatus 1 is reinforcement learning will be described.

A problem of reinforcement learning is set as follows.

The motor control apparatus observes a state of environment and determines action.

Environment changes according to some rule, and further, one's own action may change the environment.

A reward signal returns each time action is performed.

It is the sum of reward (discount) over the future that is desired to be maximized.

Learning starts from a state in which the result caused by action is completely unknown or only incompletely known. In other words, the motor control apparatus can acquire the result as data only after it actually operates. Thus, it is preferable to explore the optimum action by trial and errors.

With a state in which prior learning (a technique such as the above-described supervised learning or inverse reinforcement learning) is performed to mimic a human movement as the initial state, learning may be started from a good starting point.

"Reinforcement learning" is a method for learning appropriate action based on the interaction provided by action to environment not only by determination or sorting but also by learning action, i.e., for learning to maximize the reward obtained in future. This indicates that in the present embodiment, such action as to affect the future, which includes minimizing an error between the rotor position command and the actual position of the feed mechanism unit, can be acquired. For example, description is continued with respect to the case of Q-learning, but there is no limitation thereto.

Q-learning is a method for learning a value Q(s, a) that selects action a in some environmental state s. In other words, when there is some state s, the highest action a of the value Q(s, a) may be selected as the optimum action. However, at the origin, the correct value for the value Q(s, a) is completely unknown for a combination of the state s and the action a. Accordingly, an agent (action subject) selects various actions a under some state s and is given a reward for the action a at that time. In this case, the agent selects a better action, i.e., proceeds to learn the corrections value Q(s, a).

Further, as a result of action, it is desired to maximize the sum of the reward obtained in future, and finally, it is aimed to make $Q(s, a)=E[\Sigma \gamma^t r_t]$. Herein, the expected value is taken for the case when the state varies in accordance with the optimum action, and since it is not known, it is preferable to learn while making exploration. An update formula for such value Q(s, a) can, for example, be represented by equation (1) as follows:

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In the above equation (1), $s_t$ represents a state of the environment at a time t, and $a_t$ represents an action at the time t. The action $a_t$ changes the state to $s_{t+1}$. $r_{t+1}$ represents a reward that can be gained via the change of the state. Further, the term with max is the Q-value multiplied by γ for the case where the action a for the highest Q-value known at that time is selected under the state $s_{t+1}$. γ is a parameter of 0<γ≤1, and referred to as discount rate. α is a learning factor, which is in the range of 0<α≤1.

Equation (1) represents a method for updating the evaluation value $Q(s_t, a_t)$ of the action $a_t$ in the state $s_t$ on the basis of the reward $r_{t+1}$ that has returned as a result of the action $a_t$. It indicates that when the evaluation value $Q(s_{t+1}, \max a_{t+1})$ of the best action max a in the next state based on reward $r_{t+1}$+action a is larger than the evaluation value $Q(s_t, a_t)$ of the action a in the state s, $Q(s_t, a_t)$ is increased, whereas when smaller, $Q(s_t, a_t)$ is also reduced. In other words, it is configured such that the value of some action in some state is made to be closer to the reward that instantly comes back as a result and to the value of the best action in the next state based on that action.

Methods of representing Q(s, a) on a computer includes a method in which the value is retained as a table (action value table) for all state-action pairs (s, a) and a method in which a function approximate to Q(s, a) is prepared. In the latter method, the above-described update formula can be implemented by adjusting parameters of the approximation function by a technique, such as stochastic gradient descent method. The approximation function may use a neural network described later.

Figure 8:
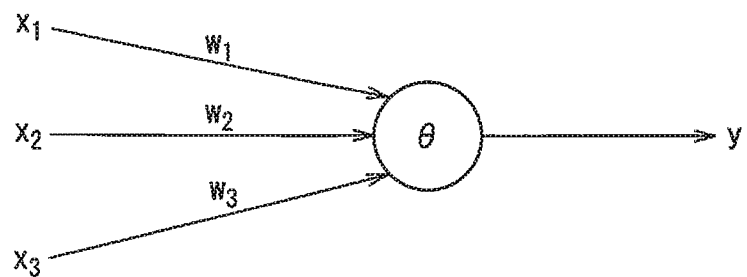
FIG. 8 is a schematic diagram illustrating a model of a neuron.

Further, as an approximation algorithm for the value function in supervised learning, unsupervised learning, and reinforcement learning, a neural network can be used. The neural network is configured, for example, of an arithmetic unit, a memory, or the like that implements a neural network imitating a model of neuron such as illustrated in FIG. 8. FIG. 8 is a schematic diagram illustrating the model of neuron.

As illustrated in FIG. 8, the neuron outputs an output y for a plurality of inputs x (by way of example herein, input x1 to input x3 in FIG. 8). Each of the inputs x1 to x3 is multiplied by a weight w (w1 to w3) corresponding to the input x. In this case, the neuron outputs the output y represented by equation (2). The input x, the output y, and the weight w all are vectors;

$$y = f_k(\Sigma_{i=1}^n x_i w_i - \theta)$$

where $\theta$ is a bias, and $f_k$ is an activation function.

Figure 9:
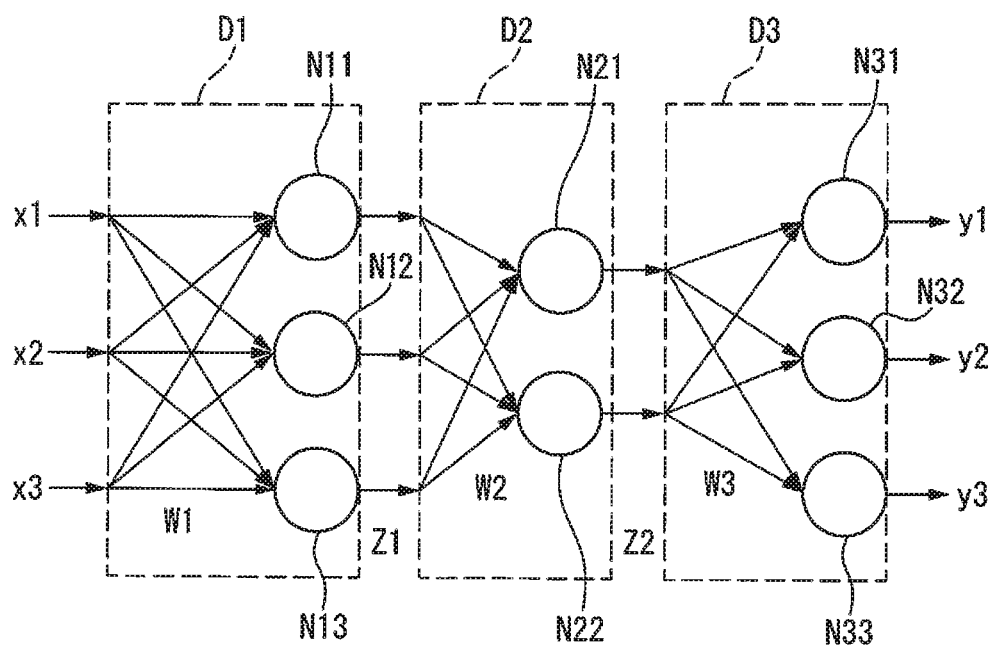
FIG. 9 is a schematic diagram illustrating a neural network having weights of three layers D1 to D3.

Subsequently, referring to FIG. 9, a description will be given of a neural network having three-layer weights, which is a combination of the above-described neurons. FIG. 9 is a schematic diagram illustrating a neural network having three-layer weights of D1 to D3.

As illustrated in FIG. 9, a plurality of inputs x (by way of example herein, input x1 to input x3) are inputted from the left hand side of the neural network, and a result y (by way of example herein, result y1 to result y3) is outputted from the right hand side.

Specifically, the input x1 to input x3 are multiplied by a corresponding weight and inputted to each of the three neurons N11 to N13. The weights applied to these inputs are collectively indicated by w1.

The neurons N11 to N13 output z11 to z13, respectively. In FIG. 9, z11 to z13 are collectively represented as a feature vector z1, and can be regarded as a vector from which the feature value of the input vector is extracted. The feature vector z1 is a feature vector between the weight w1 and the weight w2. z11 to z13 are multiplied by a corresponding weight and inputted to each of the two neurons N21 and N22. The weights applied to these feature vectors are collectively represented as w2.

The neurons N21 and N22 output z21 and z22, respectively. In FIG. 9, z21 and z22 are collectively represented as a feature vector z2. The feature vector z2 is a feature vector between the weight w2 and the weight w3. The feature vectors z21 and z22 are multiplied by a corresponding weight and inputted to each of the three neurons N31 to N33. The weights multiplied to these feature vectors are collectively represented as w3.

Finally, the neurons N31 to N33 output result y1 to result y3, respectively.

The operation of the neural network includes a learning mode and a value prediction mode. For example, in the learning mode, the weight w is learned using a learning data set, and in the prediction mode, the action decision of the motor control apparatus is performed using the parameters. Note that reference is made to prediction for convenience, but needless to say, various tasks such as detection, classification, inference, or the like are possible.

It is possible that the motor control apparatus can be actually operated in the prediction mode to instantly learn and cause the resulting data to be reflected in the subsequent action (on-line learning) and also that a group of pre-collected data can used to perform collective learning and implement a detection mode with the parameter subsequently for quite a while (batch learning). Alternatively, an intermediate case is also possible, where a learning mode is introduced each time data is accumulated to a certain degree.

The weights w1 to w3 can be learned by an error back propagation method. The error information enters from the right hand side and flows to the left hand side. The error back propagation method is a technique for adjusting (leaning) each weight so as to minimize the difference between an output y when an input x is inputted and a true output y (teacher) for each neuron.

Such a neural network can further increase the layers to three or more (referred to as deep learning). It is possible to perform feature extraction of input in a stepwise manner and automatically acquire an arithmetic unit, which regresses the results, from the teacher data alone.

Accordingly, in order to perform Q-learning described above, the machine learning apparatus 1 according to the present embodiment includes the state observation unit 11, the learning unit 12, and the decision-making unit 13, for example, as illustrated in FIG. 6. However, as described above, the machine learning method applied to the present invention is by no means limited to Q-learning. In other words, various techniques, such as "supervised learning", "unsupervised learning", "semi-supervised learning" or "reinforcement learning" that can be used for the machine learning apparatus, can be applied. Note that the machine learning herein (machine learning apparatus 1) can be realized by applying, for example, GPGPU, large-scale PC clusters or the like. For example, when supervised learning is applied, the value function corresponds to a learning model, and the reward corresponds to an error. It is also possible to use an approximate function using the above-described neural network as the action value table, and this is particularly effective when the number of s and a is huge.

In the following, an example in which the learning algorithm of the machine learning apparatus 1 is supervised learning will be described.

Figure 10:
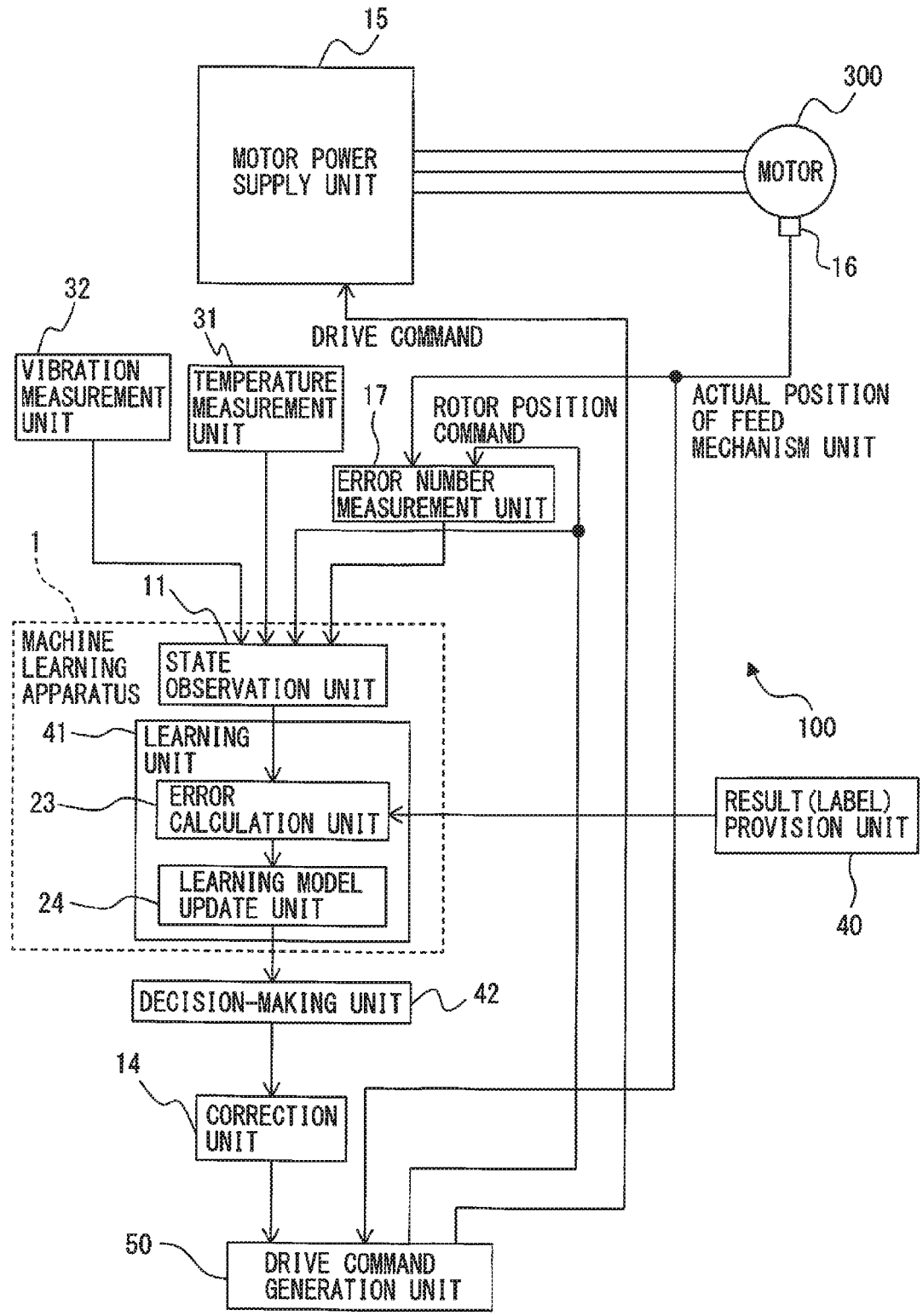
FIG. 10 is a principle block diagram illustrating the motor control apparatus including the machine learning apparatus using supervised learning according to the embodiment.
Figure 11:
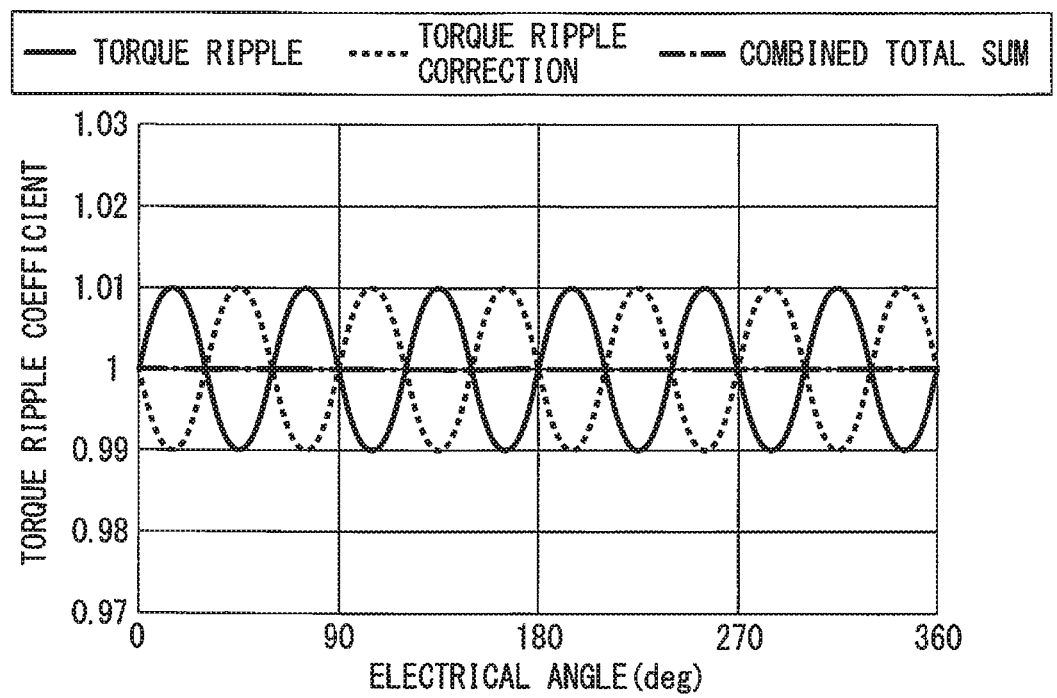
FIG. 11 is a diagram illustrating compensation of a torque ripple with the number of corrections in a reverse phase.
Figure 12:
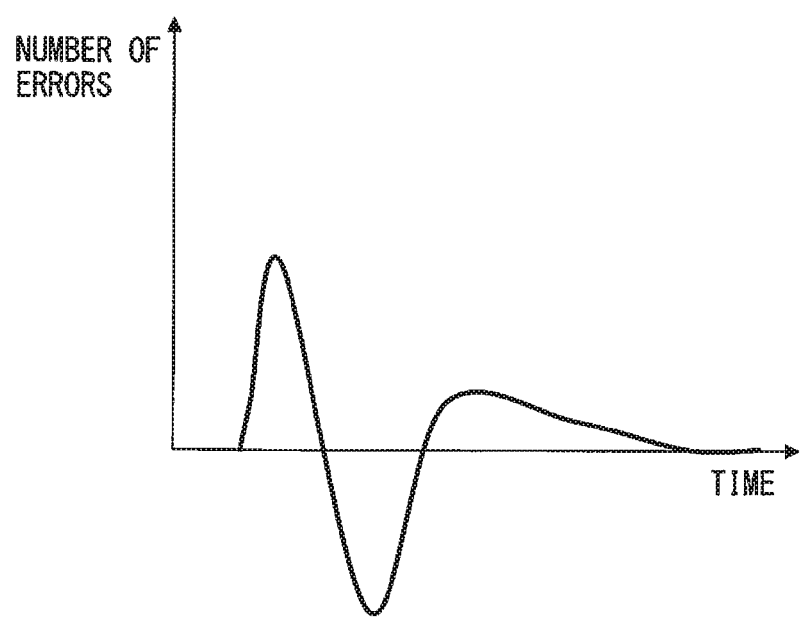
FIG. 12 is a diagram illustrating the number of errors that is not periodic.

FIG. 10 is a principle block diagram illustrating the motor control apparatus including the machine learning apparatus using supervised learning according to the embodiment. As apparent from a comparison between FIG. 10 and FIG. 6 as described above, a motor drive apparatus including the motor control apparatus including the machine learning apparatus using supervised learning as illustrated in FIG. 10 further includes, in comparison with the motor control apparatus including the machine learning apparatus using Q-learning (reinforcement learning) as illustrated in FIG. 6, a result (label) provision unit 40. Further, the machine learning apparatus 1 in FIG. 10 includes the state observation unit 11, a learning unit 41 including an error calculation unit 23 and a learning model update unit 24, and a decision-making unit 42.

In the motor control apparatus including the machine learning apparatus using supervised learning as illustrated in FIG. 10, the error calculation unit 23 and the learning model update unit 24 respectively correspond to the reward calculation unit 21 and the function update unit 22 in the motor control apparatus using Q-learning as illustrated in FIG. 6. Note that it is configured that into the error calculation unit 23, a result (label) is inputted from the result provision unit 40. The other configuration is similar to that in FIG. 6 as described above, a detailed description thereof is omitted.

Further, in FIG. 10, illustration of the speed detection unit and the current detection unit illustrated in FIG. 2 is omitted.

The result provision unit 40 provides (inputs) labeled data (result) to the error calculation unit 23 of the learning unit 41, the error calculation unit 23 receives the labeled data from the result provision unit 40 together with a signal from the state observation unit 11 and performs error calculation, and further, the learning model update unit 24 updates the learning model. For example, when the processes by the motor control apparatus 1 are the same, the result provision unit 40 can, for example, retain the labeled data obtained before the day before a predetermined day on which the motor control apparatus 100 is driven and provide the labeled data retained by the result provision unit 40 to the error calculation unit 23 on the predetermined day.

Alternatively, data obtained by simulation performed outside the motor control apparatus 100 or the like or labeled data of another motor control apparatus can be also provided via a memory card or a communication circuit to the error calculation unit 23 of the motor control apparatus 100. Further, alternatively, the result provision unit 40 can be configured by a nonvolatile memory, such as a flash memory, the result provision unit (nonvolatile memory) 40 can be housed in the learning unit 41, and the labeled data retained by the result provision unit 40 can be used as such by the learning unit 41.

In the operation of the machine learning apparatus 1 provided to the motor control apparatus 100 as illustrated in FIG. 10, to obtain the number of corrections used to correct any command of the position command, the speed command, or the current command in the motor control apparatus 100 to minimize an errors between the rotor position command and the actual position of the feed mechanism unit (minimize the number of errors), for example, from a result inputted from the result provision unit 40, the error calculation unit 23 calculates the errors based on the number of errors due to a state variable and updates the learning model in the learning model update unit 24.

Note that the machine learning apparatus 1 in the present invention is not limited to that using the above-described reinforcement learning (for example, Q-learning) or supervised learning, and various algorithms of machine learning can be used.

The above-described state observation unit 11, learning units 12, 41, and decision-making units 13, 42 may be constructed, for example, in the form of a software program or alternatively as a combination of various electronic circuits and a software program. For example, when they are constructed in the form of a software program, the function of each of the units described above is realized by operating an arithmetic processing unit in the motor control apparatus 100 in accordance with the software program. Alternatively, the machine learning apparatus 1 including the state observation unit 11 and the learning unit 12 may be implemented as a semiconductor integrated circuit in which a software program that realizes the function of each unit is written. Further, alternatively, a semiconductor integrated circuit in which a software program that realizes the function of each unit may be implemented in a form that includes not only the machine learning apparatus 1 including the state observation unit 11 and the learning unit 12 but also the decision-making units 13, 42. Further, similarly to common motor control apparatuses, the correction unit 14 and the drive command generation unit 50 may be constructed, for example, in the form of a software program or alternatively as a combination of various electronic circuits and a software program.

Further, the machine learning processing of the present invention is implemented using data relating to the number of errors obtained by the error number measurement unit 17 inherently provided to the motor control apparatus 100 for drive-controlling the three-phase alternating current motor 300, data relating to a temperature of the machine tool 300 including the motor control apparatus 100 that is measured by the temperature measurement unit 31, and data relating to vibrations generated in the machine tool including the motor control apparatus 100 that are measured by the vibration measurement unit 32 so that providing a new hardware device as in conventional techniques is unnecessary, and accordingly, the machine learning processing of the present invention can be also applied afterward to an existing motor control apparatus. In such a case, a semiconductor integrated circuit in which a software program that realizes the function of each unit of the machine learning apparatus 1 and the decision-making units 13, 42 is written may be incorporated into the existing motor control apparatus, or alternatively, a software program itself that realizes the function of each unit of the machine learning apparatus 1 and the decision-making units 13, 42 may be additionally installed in an arithmetic processing unit in the existing motor control apparatus. Alternatively, the machine learning apparatus 1 that has learned the number of corrections with respect to some motor control apparatus may be mounted to a motor control apparatus separate from the same, and may be configured to relearn and update the number of corrections with respect to the separate motor control apparatus.

According to the present invention, a machine learning apparatus and method capable of easily minimizing the number of errors between a rotor position command relative to a motor and an actual position of a feed mechanism unit, and a motor control apparatus including the machine learning apparatus can be realized.

According to the present invention, while the motor control apparatus operates, a workpiece machining condition in a machine tool having the motor as a drive source, in accordance with a magnitude of a cutting load during machining by the machine tool, a temperature of the machine tool, vibrations generated when each of drive axes operates in the machine tool having the plurality of drive axes, and the like, the machine learning apparatus automatically learns and adjusts the number of corrections relative to a command for minimizing the number of errors between a rotor position command and a rotor actual position so that regardless of changes in the surrounding environment, each number of corrections can be changed in real time and the number of errors can be appropriately minimized.

What is claimed is:

1. A machine learning apparatus that learns a condition associated with the number of corrections for any command of a position command, a speed command, or a current command in a motor control apparatus, the machine learning apparatus comprising:
  a state observation unit that observes a state variable composed of data relating to the number of errors between the position command relative to a rotor of a motor which is drive-controlled by the motor control apparatus and an actual position of a feed mechanism unit, any command of the position command, the speed command, or the current command in the motor control apparatus, data relating to a workpiece machining condition in a machine tool including the motor control apparatus, and data relating to a state of the machine tool including the motor control apparatus; and a learning unit that learns the condition associated with the number of corrections used to correct any command of the position command, the speed command, or the current command in the motor control apparatus in accordance with a training data set constituted by the state variable.

2. The machine learning apparatus according to claim 1, wherein the state of the machine tool includes at least one of a temperature of the machine tool and vibrations of the machine tool.

3. The machine learning apparatus according to claim 1, wherein the learning unit comprises:
   a reward calculation unit that calculates a reward based on the number of errors; and
   a function update unit that updates a function for calculating the number of corrections based on the state variable and the reward.

4. The machine learning apparatus according to claim 3, wherein the reward calculation unit increases the reward when the number of errors is smaller than the number of errors observed by the state observation unit before the current number of errors, and reduces the reward when larger.

5. The machine learning apparatus according to claim 3, wherein the reward calculation unit increases the reward when the number of errors is inside a specified range, and reduces the reward when the number of errors is outside the specified range.

6. The machine learning apparatus according to claim 3, wherein the function update unit updates the function for calculating the number of errors based on the state variable and the reward and in accordance with a neural network model.

7. The machine learning apparatus according to claim 1, wherein the learning unit comprises:
   an error calculation unit that calculates an error based on the number of errors; and
   a learning model update unit that updates a learning model for calculating the number of errors based on the state variable and the error.

8. The machine learning apparatus according to claim 1, wherein the learning unit is configured to learn the condition in accordance with the training data set obtained with respect to the plurality of motor control apparatuses.

9. The motor control apparatus comprising the machine learning apparatus according to claim 1, further comprising:
   a decision-making unit that determines the number of corrections based on a result learned by the learning unit in accordance with the training data set and in response to an input of the current state variable;
   a correction unit that corrects any command of the position command, the speed command, or the current command in the motor control apparatus using the number of corrections determined by the decision-making unit;
   a motor power supply unit that supplies a drive power to the motor based on the command corrected by the correction unit;
   a position detection unit that detects the actual position of the feed mechanism unit; and
   an error number measurement unit that measures the number of errors that is an error between the position command relative to the rotor and the actual position.

10. A machine learning method for learning a condition associated with the number of corrections for any command of a position command, a speed command, or a current command in a motor control apparatus, the method comprising:
    a state observation step of observing a state variable composed of data relating to the number of error that is an error between the position command relative to a rotor of a motor which is drive-controlled by the motor control apparatus and an actual position of a feed mechanism unit, any command of the position command, the speed command, or the current command in the motor control apparatus, data relating to a workpiece machining condition in a machine tool including the motor control apparatus, and data relating to a state of the machine tool including the motor control apparatus; and
    a learning step of learning the condition associated with the number of corrections used to correct any command of the position command, the speed command, or the current command in the motor control apparatus in accordance with a training data set constituted by the state variable.

* * * * *